Jan. 10, 1961  W. YOGUS  2,967,462
MILLING MACHINE ADAPTER
Filed Dec. 11, 1957  4 Sheets-Sheet 1
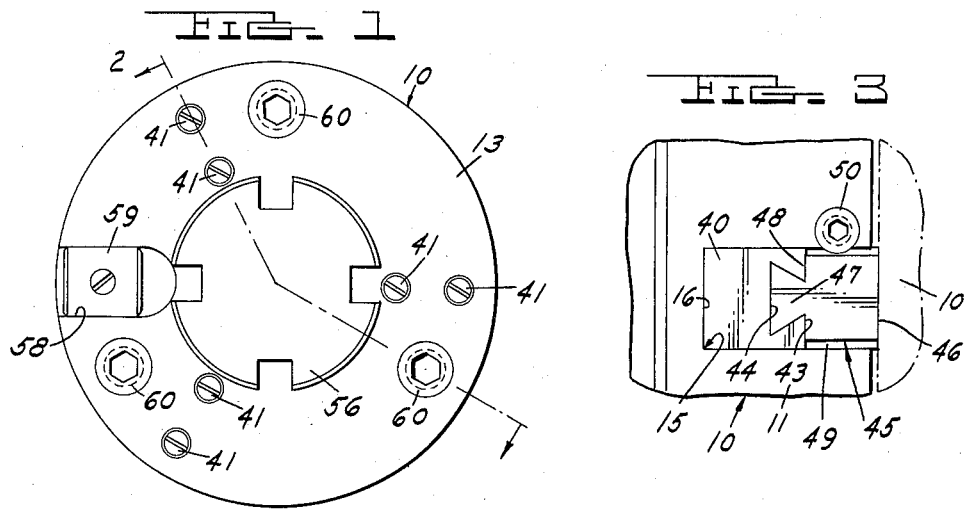
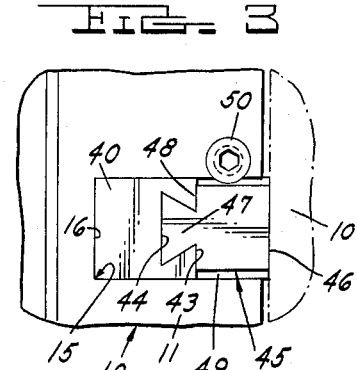
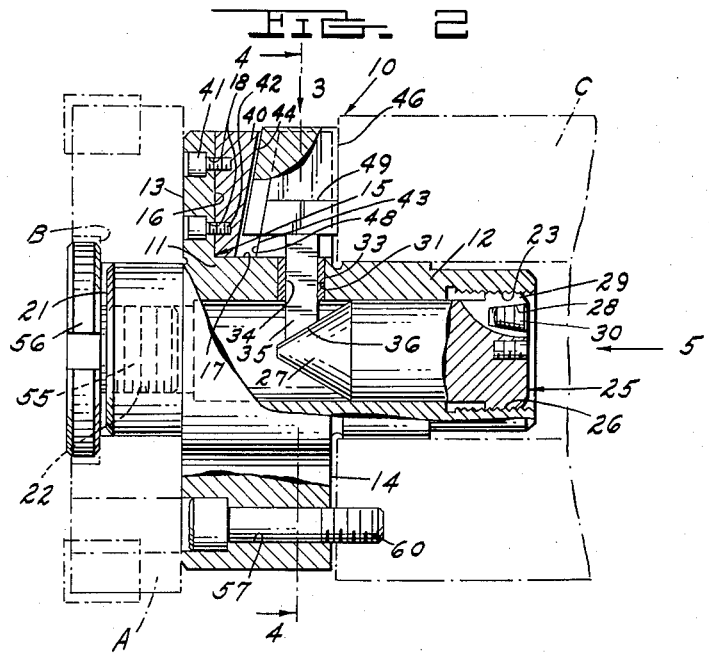
INVENTOR.
WILLIAM YOGUS
BY Farley, Forster & Farley
ATTORNEYS Jan. 10, 1961 W. YOGUS 2,967,462
MILLING MACHINE ADAPTER
Filed Dec. 11, 1957 4 Sheets-Sheet 2
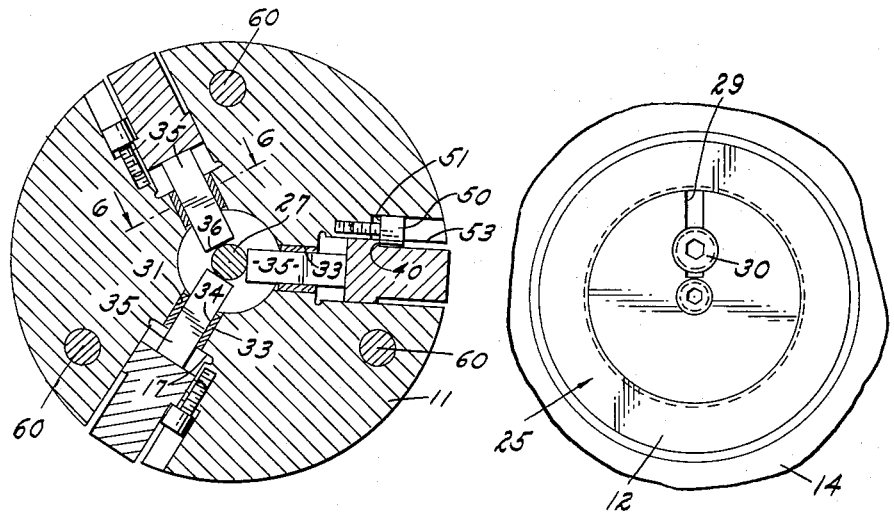
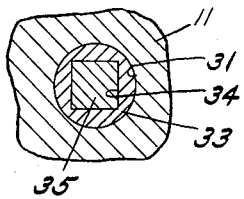
INVENTOR.
WILLIAM YOGUS
BY *Farley, Forster & Farley*
ATTORNEYS Jan. 10, 1961 W. YOGUS 2,967,462
MILLING MACHINE ADAPTER
Filed Dec. 11, 1957 4 Sheets-Sheet 3
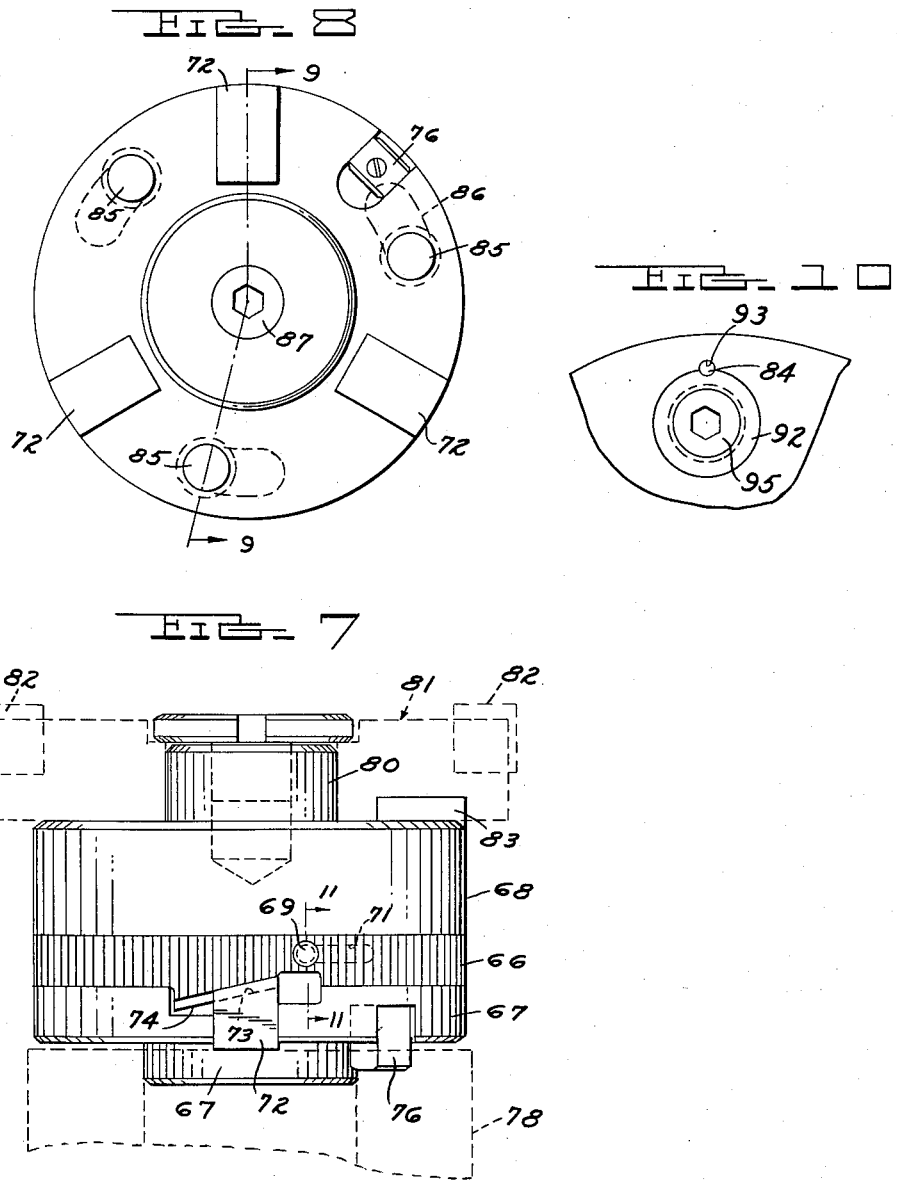
INVENTOR.
WILLIAM YOGUS
BY
Farley, Forster & Farley
ATTORNEYS

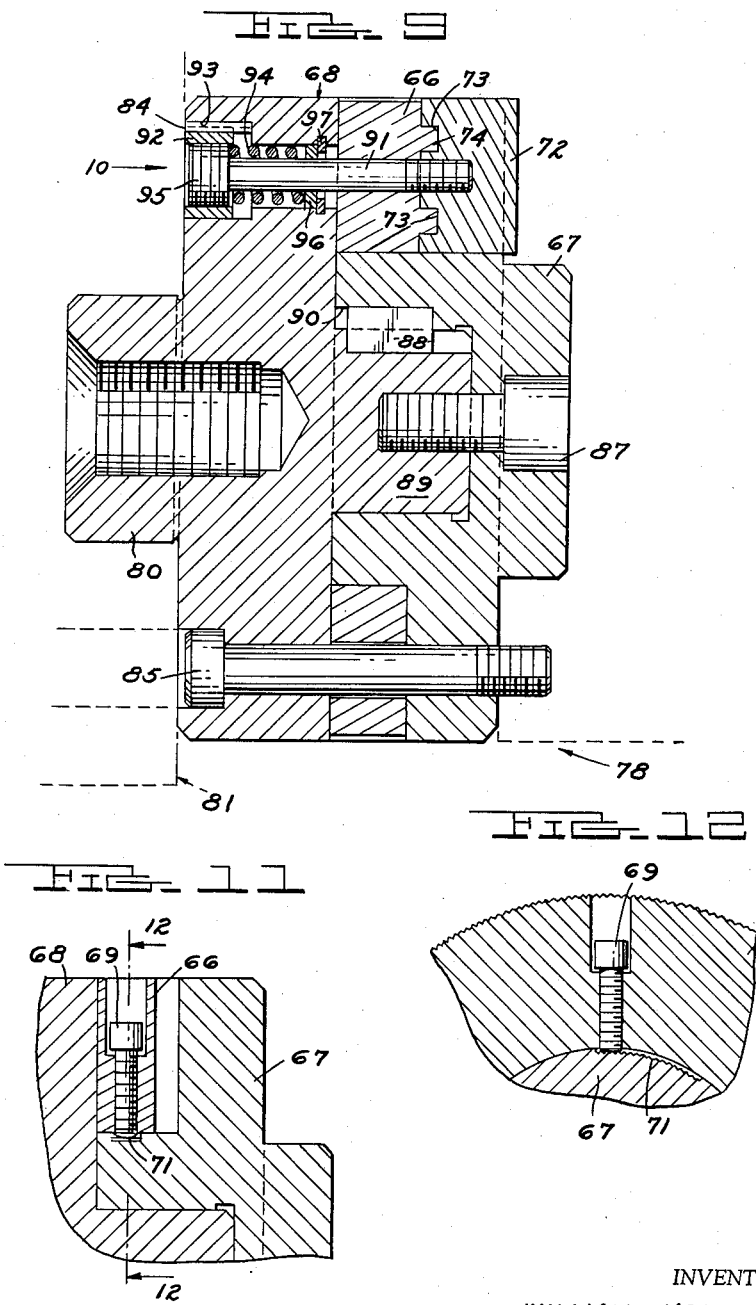

United States Patent Office 2,967,462
Patented Jan. 10, 1961

2,967,462

MILLING MACHINE ADAPTER

William Yogus, Birmingham, Mich., assignor to The Valeron Corporation, Oak Park, Mich., a corporation of Michigan Filed Dec. 11, 1957, Ser. No. 703,473

18 Claims. (Cl. 90—11)

The present invention relates to an adapter for securing a cutting tool or the like to a driving element. More particularly, the present invention proposes a novel adapter for interconnecting a face milling cutter, or similar tool, to a machine spindle.

This application is a continuation-in-part of my co-pending patent application Serial No. 631,144, filed December 28, 1956, and abandoned upon the filing of this application.

The conventional direct attachment of a milling cutter, such as a face mill cutter, to a driving spindle requires the adjustment of the cutter to its proper axially-adjusted position, i.e., toward the work, after assembly of the cutter on the spindle. Of course, such adjustment requires time of the operator, and the tool changing time, or down time, of the machine is increased accordingly. Additionally, the accuracy of adjustment may suffer because of the difficulty of adjustment mechanism while the cutter is installed on the spindle, or the hurried adjustment of the cutter to reduce the machine down time.

The present invention provides an adapter to which a replacement tool may be attached and adjusted prior to the assembly of the tool on the spindle. Thus, it is only necessary to secure the cutter-adapter assembly to the spindle, so that the machine operation can be immediately resumed after such adapter-to-spindle assembly is completed. By gauging the tool-to-adapter adjustment, an accurate final tool-to-spindle position can be obtained, and the adjustment can be made during operation of the machine and without the necessity of shutting down the machine for more than the minimum worn tool removal and adapter-to-spindle assembly period.

The adapter of the present invention generally comprises an adapter body for insertion between the machine spindle and the tool. Means are provided for securing a tool to the exposed face of the adapter, and means are provided at the other or spindle-contacting face of the adapter for accurately spacing the tool with respect to the spindle. This positioning means preferably includes a plurality of fixed and mating radially adjustable dovetail blocks having cooperating ramp surfaces adapted to provide axial adjustment of spindle engaging locating surfaces which accurately space the tool from the spindle. The adjusting mechanism includes a central element adjustable axially of the adapter and having a conical surface which contacts a plurality of radially movable adjustment pins. These adjustment pins in turn contact the radially movable dovetail blocks to move these blocks relative to the cooperating fixed ramp surfaces. Preferably, the adjustable dovetail blocks are confined between a pair of counteracting locking elements, including the adjustment pins, so that the locating surfaces project axially beyond the adapter for abutment with the spindle.

It is only necessary to adjust the adapter blocks to the desired axial tool-spindle dimension to accurately position the tool relative to the spindle. This may be readily done by placing the tool face downward upon a surface plate and adjusting the adapter blocks to the desired tool-spindle dimension from the reference surface. Upon subsequent attachment of the adapter to the spindle in abutment with the spindle reference face, the desired spindle-tool dimension is obtained without adjustment of the tool after its assembly in the machine.

A second embodiment of this invention provides for an adapter having a circular adjustment ring with a multiplicity of cam surfaces which act against cam follower adjusting blocks. A threaded member which is attached to the blocks and passes through the ring is spring-mounted so as to urge the block against the cam surfaces of the ring thereby providing an automatic return when the ring is turned in a block retracting direction.

Thus, it is possible to have one or more spare adjusted tool and adapter assemblies available for ready insertion into and attachment to the spindle and the mere attachment of the pre-adjusted tool and adapter assembly to the machine accurately positions the cutting face relative to the spindle. The worn tool may then be reground and re-adjusted in its adapter without any machine down time other than that incident to the simple exchange of adapters which are readily detached and attached to the spindle.

It is, therefore, an important object of the present invention to provide an adapter for accurately positioning a tool relative to a driving spindle.

A further important object of this invention is the provision of an adapter for a cutting tool, the adapter being effective to accurately position the tool relative to a driving spindle upon the mere attachment of the adapter to the spindle.

It is a further object to provide an improved adapter for positioning between a spindle and a tool adapted to be driven by the spindle, the adapter having adjustable elements which can be positioned prior to tool-spindle assembly to maintain a desired tool-spindle dimension.

Yet another object of this invention is the provision of an adapter adapted to be interposed between a driving spindle and a tool to position the tool accurately relative to the spindle, the adapter having adjustable positioning blocks abuttable with the spindle upon attachment of the adapter thereto for determining the desired spindle-tool dimension.

A further object is to provide an improved adapter having adjustable positioning elements which are automatically returned to a retract position.

Other and further objects of the present invention will be apparent form the accompanying drawings, in which:

Figure 1 is a front elevational view of an adapter of the present invention;

Figure 2 is a sectional view taken along the plane 2—2 of Figure 1;

Figure 3 is a fragmentary view taken in the direction of the arrow 3 of Figure 2;

Figure 4 is a sectional view taken along the plane 4—4 of Figure 2;

Figure 5 is an enlarged fragmentary rear elevational view;

Figure 6 is an enlarged fragmentary sectional view taken along the plane 6—6 of Figure 4;

Figure 7 is a plan view of a second embodiment having an adjustment ring and automatically returnable adjustment elements;

Figure 8 is a view of the spindle end of the adapter shown in Figure 7;

Figure 9 is a section taken at 9—9 of Figure 8;

Figure 10 is a view taken from the cutter end of the adapter shown in Figure 9 showing the spring tension screw;

Figure 11 is a section taken at 11—11 of Figure 7 showing the ring lock screw; and Figure 12 is a section taken at 12—12 of Figure 11 showing the knurled portion of the spindle attachment against which the ring lock screw acts.

In Figure 1, reference numeral 10 refers generally to an adapter of the present invention having a generally cylindrical adapter body 11 having a generally cylindrical rearwardly projecting embossment 12 and a generally cylindrical forwardly projecting embossment 21 extending axially therefrom.

The cylindrical body 11 has a circular front face 13 and a circular rear face 14. The body 11 is provided with a series of peripheral notches indicated generally at 15 and defined by radially-extending faces 16 and axially-extending faces 17. A plurality of such notches are provided, the illustrated embodiment having three notches 15 which are arranged symmetrically about the axis of the body 11 (Figure 4). It will be noted that the notches 15 extend axially from the rear wall 14 toward the front wall 13 of the body 11, the notches terminating in spaced relation to the front wall 13, which is provided with a pair of apertures 18 communicating with the notches 15.

The adapter is provided with a central axial bore 20 which extends completely through the body 11, the rearwardly facing embossment 12, and the forwardly projecting embossment 21. That portion of the bore 20 lying within the embossment 21 is threaded, as at 22, while the portion of the bore 20 lying at the rear end of the rear embossment 12 is threaded, as at 23.

Projecting into the bore 20 is an actuating element indicated generally at 25 which preferably takes the form of a generally cylindrical plug having enlarged peripheral threads 26 at its rear end, for engaging the bore threads 23 and a frustoconical pointed nose 27 projecting into the body portion 11 for radial alignment with the notches 15 when the actuating element 25 is inserted into the bore 20, as illustrated in Figure 2. The rear threaded end of the element 25 is provided with a tapered threaded recess 28, and the threaded portion 26 of the element 25 is provided with a radial saw cut 29 located medially of the recess 28 and extending radially therethrough. A tapered and threaded plug 30 is inserted in the recess 28 and, by axially advancing the plug 30 into the recess 28, the threaded rear end of element 25 may be expanded because of the cut 29 to jam the threads 26 against the recess threads 23, thus effectively locking the element 25 in an axially adjusted position.

The axially extending floor or wall 17 of each of the notches 15 is provided with a radially extending passage 31 establishing communication between each of the notches 15 and the interior bore 20. An insert ring 33 is press fitted into each of the passages 31, the insert rings being provided with an axial polygonal opening 34, the opening 34 being substantially square in the preferred illustrated embodiment of the invention.

Extending generally radially of the body 11 to project through each of the bores 31 and through the corresponding insert aperture 34 is a polygonal pin 35. This pin 35 is provided with a lower surface 36 complementary to and in full mating contact with the nose portion 27 of the actuating element 25, and the pin 35 is of a cross section which corresponds to the cross section of the insert aperture 34. In the illustrated embodiment of the invention, the pin 35 is square to mate with the square aperture 34.

It will be appreciated that the pin 35 will be moved radially of the body 11 upon threaded adjustment of the actuating element 25 to axially advance the conical cam surface 27 of the element 25. The pins 35 may thus be best functionally described as cam follower elements adjustably positionable radially of the adapter assembly 10 by axial threaded adjustment of the cam-carrying element 25.

Mounted within each of the notches 15 is a fixed dovetail block 40. This block 40 is fixedly secured to the body by suitable means, as by screws 41 projecting through the aperture 18 into threaded recesses 42 formed in the block 40. Each of the blocks 40 is bottomed against the bottom surface 17 of the corresponding notch 15, and each block is provided with a rearwardly facing dovetail ramp surface 43 which is inclined radially outwardly and axially rearwardly relative to the remainder of the adapter body 11. This ramp surface 43 of each of the blocks 40 is centrally apertured for communication with an elongated dovetailed recess 44 formed interiorly of the block 40.

This recess 44 is adapted to guidingly engage a cam positioned adjustable dovetail block indicated generally at 45, one such block being positioned in each recess 15. The block 45 has a rearward, radially-extending surface 46 opposing the forwardly located dovetail extension 47 insertable into and engageable with the walls of the dovetail recess 44 formed in the corresponding blocks 40. Additionally, each block 45 has forwardly directed ramp surfaces 48 engageable with the inclined ramp surfaces 43 of the adjacent block 40. It will be seen that the blocks 45 are adjustable radially and axially of the body 11 of the adapter. The axial adjustment of the blocks 45 occurs as the consequence of the radial displacement of the blocks 45 and the guiding engagement between the mating ramp surfaces 43 and 48 of the blocks 40 and 45, respectively.

Additionally, each block 45 is provided with laterally directed lower shoulders 49 (Figure 3) which are adapted to be engaged by retaining elements 50. These retaining elements preferably take the form of screws having lower radial shoulders 51 engageable with the stop shoulders 49 to prevent displacement of the block radially outwardly of the body 11. The elements 50 are retained in apertures 53 formed in the periphery of the body 11 immediately adjacent and in peripheral registry with the notches 15.

The threads 22 in the forwardly directed embossment 21 of the body 11 receive therein a threaded lock stud 55 formed integrally on, or fixedly secured to an enlarged locking flange 56. The body 11 is also provided with a plurality of radially spaced screw bores 57 for a purpose to be hereinafter more fully described.

The use of the adapter of the present invention may be best understood by inspection of Figure 2, wherein a tool, such as a face mill cutter, is indicated in dotted outline at A, the tool having a central bore adapted to receive the embossment 21 therein, the retaining flange 56 overlapping a radially-directed central flange B of the tool A to retain the tool in position against the front face 13 of the body 11. A radial key slot 58 formed in the front face plate 13 of the body 11 is adapted to receive a key 59 which is insertable into a corresponding key slot formed in the rear of the tool A to aid the retaining flange 56 in securing the tool A to the body 11 for co-rotation.

Reference letter C refers generally to the driving element or spindle of a machine tool, such as a face mill, to which the adapter is secured by suitable means, as by screws 60, projecting through the bores 57 into threaded engagement with the spindle seat. It will be noted that the front face of the spindle C does not contact the rear surface 14 of the adapter body 11, but rather contacts the radial surface 46 of the plurality of positioning blocks 45.

As has been heretofore explained, the dimension which must be retained accurately in any machine tool operation such as herein contemplated is the positioning of tool A axially with respect to the driving spindle C. By adjustment of the blocks 45, a desired axial dimension can be readily attained, gauged and retained during assembly of a replacement tool adapter 10 upon the spindle C.

The establishment of this dimension is attained prior to assembly of the tool A and adapter 10 upon the spindle C. Initially, the tool A is secured to the adapter 10 by means of the attachment stud 55 and the driving key in the radial slot 58. Next, the face of the tool A is placed in contact with a reference surface plate so that the adapter is positioned above the tool. The tapered plug 30 is then backed off and the blocks 45 moved radially inwardly so as to facilitate the required adjustment.

This adjustment, of course, is obtained by rotating the plug 25, interengagement of the threads 26 and 23 causing the axial advancement of the plug nose 27. It will be noted that the cylindrical body of the plug 25 is closely guided in the cylindrical bore 20, so there will be no cocking or loose movement of the cam nose 27 in the bore. Axial advancement of the cam nose 27 will cause a corresponding radial movement of the cam follower pins 35 which, in contact with the under surface of the adjustment blocks 45, will cause corresponding radial movement of these blocks 45. Through the cooperating ramp faces 43 and 48 of the fixed blocks 40 and the movable blocks 45, respectively, the radial faces 48 of the movable blocks 45 will be varyingly positioned axially of the body 11 and axially of the tool A and accurately gauged as by an indicator previously set to the required reference dimension. Of course, the retaining screws 50 must be loosened or backed off to facilitate radial adjustment of the blocks 45.

Once the blocks have been adjusted to obtain the desired axial dimension between the rear locating faces 46 of the blocks 45 and the tool A, the plug 25 is fixedly positioned in the bore 20 by threaded advancement of the plug 30 to spread the threads 26 into locking engagement with the bore threads 23. This will position the cam follower pins 35 against radially inward movement. The blocks 45 are then locked in position by means of the retaining screws 50 bearing against the block shoulders 49. The blocks 45 thus are held against radial outward movement by the shoulders 51 of the retaining screws 50, against radial inward movement by their engagement with the cam follower pins 35, and against axial movement by engagement of the dovetail projection 47 of the blocks 45 with the dovetail recesses 44 of the blocks 40.

Thus, the desired dimension between the locating faces 46 of the blocks 45 and the tool A is set. Upon subsequent assembly of the adapter 10 and the tool A upon the spindle C, abutment between the locating faces 46 and the spindle C will fix accurately the desired spindle-tool dimension.

The second embodiment of this invention as shown in Figures 7-12 employs cam ring 66 having an outer knurled portion for non-slip gripping and turning, rotatably mounted between spindle attachment 67 and adapter body 68. Threadedly mounted in ring 66 is locking screw 69 which engages a knurled track portion on attachment 67 which is also seen in Figures 11 and 12. Cam adjusting blocks 72, of which there are three, are mounted in attachment 67 for longitudinal or axial sliding and have an inner cam surface 73 registerable with raised cams 74 on ring 66. Key 76, mounted in attachment 67, registers with spindle 78 which is driven by turning means, not shown. The outer ends of adjusting blocks 72 register against spindle 78 providing a variable axial spacing for the adapter unit depending on the rotative position of ring 66. It is seen that as ring 66 is turned rightwardly, block 72 will be urged outwardly increasing the axial spacing. Shank portion 80 forms an integral part of body 68 and is adapted to center a cutting assembly 81, having cutting blades 82, which is keyed to body 68 by means of projection 83. Figure 8 shows the cam adjusting blocks 72 and the key 76. Also shown are bolts 85 which fasten body 68, through slots 86 in ring 66 to spindle 78. The length of slots 86 is determined by the length of cams 74 and permits sufficient ring rotation for full cam adjustment.

Center bolt 87 fastens attachment 67 directly to body 68 as seen in Figure 9. In Figure 9 is also seen key 88 which is carried by extension 89 of body 68 and also slot 90 which is formed in attachment 67 thereby insuring alignment between body 68 and attachment 67. Raised cam surfaces 74 form two parallel lands which engage corresponding grooves of blocks 72. Attached centrally of each block 72 is threaded screw 91 which has a sliding fit with a circumferential slot in ring 66 and is threaded at each end engaging block 72 at one end and nylon plug 92 at the other. Plug 92 is keyed to slot 93 of body 68 by pin 84 to permit its axial movement but to prevent its rotational movement. Spring 94 acts against head 95 of screw 91 and ring 96 which is supported in fixed axial relation to body 68 by lock washer 97. It is seen that by turning screw 91, spring 94 is adjustably tensioned thereby providing a variable holding force between cams 74 and cam block 72. It is seen, therefore, as ring 66 (Figure 7) is turned in a retracting or leftward direction, block 72 will automatically retract under the tension of spring 94. This permits adjustment of blocks 72 in a retract or leftward direction (Figure 9) without requiring individual block placement. Also, due to the large knurled circumference of ring 66, the ring and the blocks may be positioned by finger turning thereby increasing the speed and sensitivity of adjustment. Ring 66 may carry an indexing mark and body 68 may be calibrated to further reduce adjustment time. This adapter permits out-of-machine adjustment by simply loosening set screw 69 (Figures 11 and 12) turning ring 66 the required amount and then tightening set screw 69. The adjusting blocks 72 automatically follow raised cam surfaces 74 whether ring 66 is turned in an increasing or decreasing direction.

While preferred embodiments of my invention have been described above in detail, it will be understood that numerous modifications may be resorted to without departing from the scope of the following claims.

I claim:

1. An adapter for a milling machine or the like having a rotatable element for driving connection to a tool, comprising an adapter body adapted to be interposed between the tool and the element, said body having a radial slot therein, a registration block supported in said slot for movement radially and axially of the body, said block having a registration surface adapted for contact with the rotatable element and an opposing ramp surface contacting a ramp surface fixed to the body, and means for radially adjusting the position of said block relative to the fixed ramp surface to adjust the position of the registration surface axially relative to the body.

2. An adapter for a face mill or the like having a spindle for driving connection to a cutter, comprising an adapter body adapted to be interposed in co-rotatable relationship between the cutter and the spindle, said body having a radial slot therein, a registration block disposed in said slot for movement radially and axially of the body, said block having a registration surface projecting axially beyond said body for contact with the spindle, cooperating inclined ramp surfaces on said body and said block, and means projecting into said slot for adjusting the radial position of said block ramp surface relative to the fixed ramp surface, thereby adjusting the axial position of the registration surface relative to the body.

3. An adapter for a face mill or the like having a spindle for driving connection to a cutter, comprising an adapter body adapted to be interposed between the cutter and the spindle, said body having a radial slot and an axial bore communicating with said slot, a registration block supported in said slot for movement radially of the body, said block having a radial registration surface adapted for contact with the spindle and an opposing ramp surface contacting a fixed ramp surface on the body, and means including a first element adjustably insertable into said bore and a second element projecting from the bore into said slot for radially adjusting the position of said block relative to the fixed ramp surface, thereby adjusting the position of the registration surface relative to the body.

4. In an adapter for a face mill or the like having rotatable means for driving connection to a tool, an adapter body adapted to interconnect the tool and the rotatable means, said body having a face immediately adjacent the spindle and having a radial slot therein, a registration block disposed in said slot, said block having a registration surface adapted to project beyond the one body face for contact with the rotatable means and an opposing ramp surface contacting a complementary ramp surface on the body, and means for radially adjusting the position of said block, said means comprising an axially adjustable insert projecting into the body and having a cam surface radially aligned with the body slot, and a cam follower element interconnecting the cam surface and the block.

5. An adapter for securing a tool element to a machine tool driving element in predetermined dimensional relation, comprising an adapter body, a plurality of circumferentially spaced adjustment blocks guidably disposed in said body for radial and axial adjustment relative thereto, the blocks projecting beyond the body for abutment with one of said elements, cam means carried by said body for adjusting said blocks radially and axially, and means for securing said blocks in an adjusted position.

6. An adapter for securing a tool element to a machine tool driving element in a predetermined and adjusted position, comprising an adapter body, an adjustment block carried by said body for adjustment in a plane inclined with respect to a radial plane of the body, the block having a portion projecting beyond the body for abutment with one of the elements, and means for retaining the block in an adjusted position in said inclined plane to thereby determine the relative positions of said elements.

7. An adapter adapted to be interposed axially between a tool element and a tool driving element, comprising a body member, a slidable block carried thereby for movement in a plane inclined to a radial plane of said member, said block projecting axially beyond the confines of said body member, and means clamping said block in an adjusted position in said plane, whereby the axial dimension of said body and the axial spacing of said elements is determined by the positioning of said block.

8. An adapter for securing a tool element to a machine tool driving element in a predetermined and adjusted position, comprising an adapter body of generally cylindrical contour having an axial recess and a plurality of peripheral notches communicating with said recess, radially and axially movable blocks disposed in said notches for adjustment to predetermined radial and corresponding axial positions, an adjustment plug positioned in said recess, said plug having a conical nose radially alignable with said notches, a cylindrical body guided by said recess and a threaded engagement with said body to vary the position of said nose axially in said body and relative to said recesses, and means projecting radially from said nose to said blocks to shift the blocks radially as said nose is adjusted axially in said body.

9. An adapter as defined in claim 8, wherein said last named means are elongated pins having nose-contacting inner ends tapered for mating contact therewith and block-contacting outer ends.

10. An adapter as defined in claim 8, wherein said blocks have inclined cam surfaces mating with correspondingly inclined surfaces on the body to accommodate simultaneous radial and axial adjustment of the blocks.

11. An adapter as defined in claim 10, wherein said inclined surfaces on the blocks and the body are provided with interlocking dovetail tongue and groove surfaces to control axial displacement of said blocks while accommodating relative radial adjustment.

12. An adapter as defined in claim 8, wherein the body carries locking screws adapted to contact each block, respectively, urging the same in a radially inward direction to retain the blocks in a predetermined position.

13. An adjustable axial spacing element comprising an element body, said body carrying an axially rotatable ring, said ring having a circumferential ramp surface, said body carrying an axially movable adjustment element having a circumferential cam surface registerable with said circumferential ramp, so that on the rotation of said ring said ramp will act against said cam surfaces to provide axial adjusting movement to said adjustment element.

14. The assembly of claim 13 with spring means for urging said adjustable element against said circumferential ramp to automatically provide a return to said ramp surfaces when said ring is rotated in an element retracting direction.

15. The element or assembly in claim 13 with a spring assembly for urging said adjustment element against said circumferential ramp comprising a spring retainer connected to said adjustment element, said retainer carrying spring means which are positioned within said body and act between said body and said retainer to exert an axial spring force on said adjustable element against said ramp surfaces.

16. The assembly of claim 15 with said spring retainer inserted through a slot in said ring and threadedly engaged with said adjusting element, a lock washer mounted in said body, said spring being mounted between said washer and spring engaging means on said spring retainer to urge said retainer and said adjusting element in an axial direction.

17. The assembly of claim 16 with said retainer mounted in a body supported bearing for insuring retainer stability and preciseness of adjustment.

18. An adapter for placement between a tool element and a tool driving element, comprising a body element having axial faces facing said tool element and said tool driving element, a multiplicity of adjustment elements being movably mounted in said body element and extendable from an axial face thereof, adjustment means for positioning said adjustment elements to vary the axial spacing between said driving element and said tool element.

References Cited in the file of this patent

UNITED STATES PATENTS

| | | |
|---|---|---|
| 1,839,569 | Lovejoy | Jan. 5, 1932 |
| 2,445,147 | Meunier | July 13, 1948 |
| 2,556,372 | Johnston et al. | June 12, 1951 |
| 2,739,818 | Benjamin et al. | Mar. 27, 1956 |